Feb. 5, 1924.  1,482,658
F. A. OLCOTT
COMBINED BUMPER AND FENDER BRACE
Filed Sept. 27, 1923   2 Sheets-Sheet 1
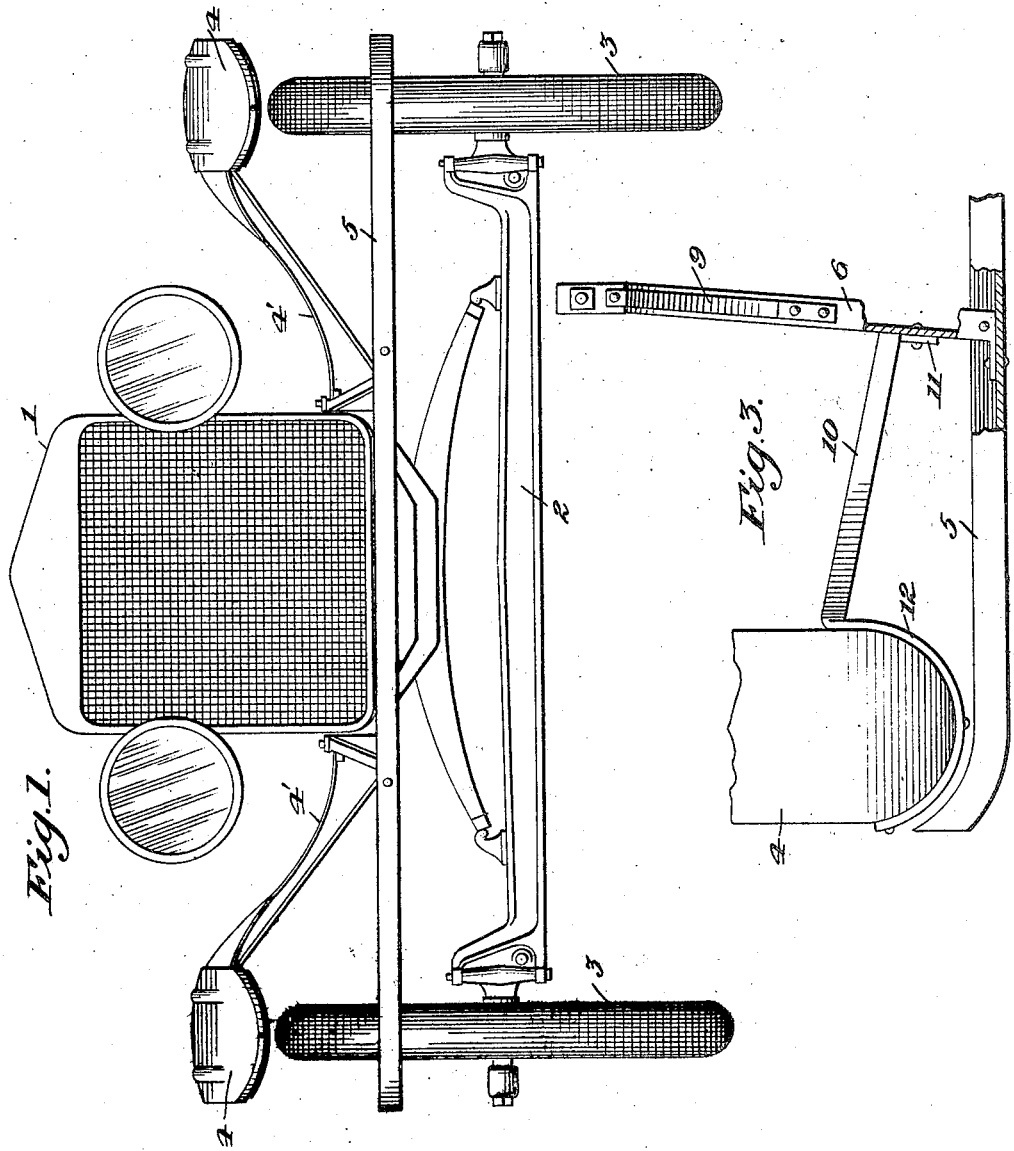
Inventor:
F. A. Olcott,
Chas. E. Riordon
Att'y.

Feb. 5, 1924.
F. A. OLCOTT
1,482,658
COMBINED BUMPER AND FENDER BRACE
Filed Sept. 27, 1923      2 Sheets-Sheet 2
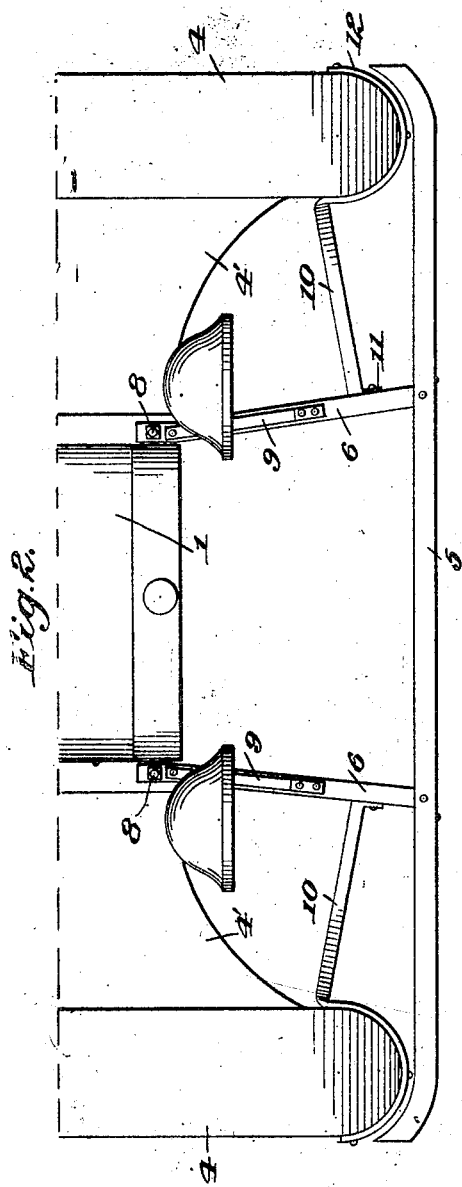
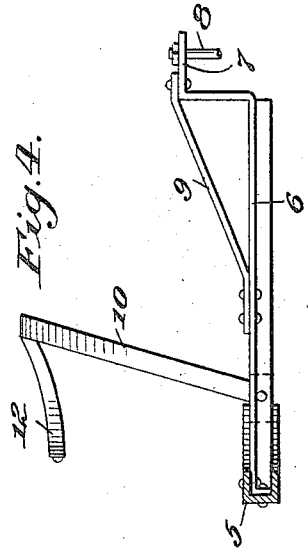

Patented Feb. 5, 1924.

1,482,658

UNITED STATES PATENT OFFICE.

FRANK A. OLCOTT, OF COLUMBUS, NEBRASKA.

COMBINED BUMPER AND FENDER BRACE.

Application filed September 27, 1923. Serial No. 665,186.

*To all whom it may concern:*

Be it known that I, FRANK A. OLCOTT, of Columbus, in the county of Platte and State of Nebraska, a citizen of the United States, have invented certain new and useful Improvements in Combined Bumpers and Fender Braces, of which the following is a specification.

This invention has reference to bumpers for automobiles more particularly of the Ford type, and includes a fender bracing structure.

The main object of the present invention is to so arrange the fender brace with relation to the bumper that although carried by the latter, it will be substantially free from damage when the bumper bar is subjected to impact.

Another object resides in so constructing and arranging the device that a maximum of bracing strength is obtained without materially altering the general appearance of the machine.

The above and other objects are carried out by supporting the fender braces by arms extending from points rearward of the impact element of the bumper and securing such supporting arms to the fender flanges.

Other features will more clearly hereinafter appear by reference to the accompanying drawings forming a part of this specification and wherein like numerals of reference designate corresponding parts throughout the several views, in which:—

Figure 1 is a front view of an automobile showing the device in position.

Figure 2 is a top plan view of the front portion of an automobile showing the present invention secured in position.

Figure 3 is an enlarged fragmentary plan view of a portion of the invention, parts being broken away in section, and Figure 4 is a transverse section showing the device detached.

For the purpose of illustrating my invention, I have shown an automobile of the Ford type, the present invention being particularly adapted for this type of machine, and including the engine hood 1, axles 2, wheels 3, fenders 4 and fender skirt 4′. A bumper bar 5, formed of channel iron or other suitable material is supported by and attached to the chassis of the machine by means of support 6. These supports are identical in construction and each includes the elongated body portion of angle iron and the flat end portion which is secured to the chassis. This flat end portion is bent upwardly at right angles to the body and the extremity 7 is again bent to extend parallel with the body thereby forming an off-set portion which is provided with perforations for the reception of suitable bolts 8 by which it is secured in position. The provision of this off-set portion 7 is obviously essential for the proper placing of the bumper with relation to the front of the machine. Angular brace bars 9, shown more clearly in Figure 4, extend from the supports 6, at points substantially intermediate their length to the tops of the off-set portions, and at these points lie parallel to the adjacent faces of the supports to permit satisfactory riveting or bolting.

Projecting from the supports 6 at points rearward of their engagement with the impact member are the fender braces. These fender braces each include the shank portion 10, the angular extremity 11 and the curved extremity 12, the angular extremity 11 being bent to permit proper engagement with the side wall of the supports 6, and the curved extremity being shaped to conform to the curve of the front flange of the fenders. These extremities may be bolted or riveted in their proper positions as may be desired. With reference to these fender braces, it will be noted that each brace comprises an integral construction being shaped at either end to function as heretofore indicated. Attention is also called to the fact that the construction and arrangement of these parts is such that they are located, when in position, below the skirt 4′ of the fender which eliminates the unsatisfactory appearance caused by the braces at present in use extending across the front of the machine.

Obviously numerous changes in details of construction and arrangements of parts can be made without departing from the spirit of the invention, which resides in a strong, durable and yet economical construction, neat and pleasing in appearance.

What I claim is:—

1. In combination with an automobile including fenders therefor, a bumper bar, supporting arms for said bumper bar, a separate brace carried by and for each of said supporting arms, and means fixed to said supporting arms and engaging said fenders at points below their upper surfaces.

2. In a device of the character described, including an automobile provided with flanged fenders, a bumper bar, spaced supporting members for said bumper bar comprising angular body portions and upwardly offset end portions, a brace connecting the body portion and the offset portion, and fender braces carried by said last mentioned body portion.

3. In a device of the class described, including an automobile provided with flanged fenders, a bumper bar, supporting arms for said bumper bar, braces for said supporting arms, and fender braces fixed to said supporting arms having their extremities curved to conform to and for engagement with the front flange of the fenders.

4. In a device of the class described, including an automobile provided with flanged fenders, a bumper bar, supporting arms for said bumper bar comprising angular body portions and flat offset portions, means for securing the offset portions to said automobile, braces connecting the body portions with the off-set portions, and fender braces projecting from said supporting arms.

5. In combination with an automobile including flanged fenders, a bumper bar, supporting arms for said bumper bar comprising elongated body portions and off-set extremities, means for securing the off-set extremities to the automobile, braces for said supporting arms engaging same at points intermediate their length and at the off-set portions, and fender braces secured to the side faces of said supporting arms formed with curved extremities for engagement with the fender flanges.

In testimony whereof I hereunto affix my signature.

FRANK A. OLCOTT.